US009354450B2

(12) United States Patent  
Pan et al.

(10) Patent No.: US 9,354,450 B2  
(45) Date of Patent: *May 31, 2016

(54) DISPLAY APPARATUS AND LIGHT EMITTING MODULE THEREOF

(71) Applicant: Innolux Corporation, Miao-Li County (TW)

(72) Inventors: Cheng-Cheng Pan, Miao-Li County (TW); Jen-Chih Yang, Miao-Li County (TW); Ta-Chin Huang, Miao-Li County (TW); Chou-Yu Kang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,723

(22) Filed: May 19, 2014

(65) Prior Publication Data

US 2014/0355113 A1    Dec. 4, 2014

(30) Foreign Application Priority Data

May 28, 2013    (TW) .............................. 102118759 A

(51) Int. Cl.
*G02B 27/22* (2006.01)
*F21V 8/00* (2006.01)

(52) U.S. Cl.
CPC .......... *G02B 27/2214* (2013.01); *G02B 6/0038* (2013.01); *G02B 6/0061* (2013.01)

(58) Field of Classification Search
CPC ............. G02B 27/2214; G02B 6/0033; G02B 6/0036; G02B 6/0038; G02B 6/0043; G02B 6/0058; G02B 6/006; G02B 6/00356; G02B 6/004; G02B 6/0041; H04N 13/00; H04N 13/0409; G02F 1/01051

USPC .......... 359/462, 240; 362/607, 608, 611, 613, 362/623–626, 628, 617, 620, 619; 345/690; 385/31

See application file for complete search history.

(56) References Cited

U.S. PATENT DOCUMENTS

2007/0222915 A1 * 9/2007 Niioka et al. ................... 349/62  
2009/0129116 A1    5/2009 Kim et al.

(Continued)

FOREIGN PATENT DOCUMENTS

CN    101435893 A    5/2009  
CN    103105696 A    5/2013

(Continued)

OTHER PUBLICATIONS

TW Office Action dated Dec. 16, 2014.

(Continued)

*Primary Examiner* — Scott J Sugarman  
*Assistant Examiner* — Ibrahima Diedhiou  
(74) *Attorney, Agent, or Firm* — McClure, Qualey & Rodack, LLP

(57) ABSTRACT

A display apparatus comprising a display panel and a light module is provided. The light module comprises a light guide plate, a plurality of light guide elements and at least a light emitting unit. The light guide plate comprises at least one light incident surface, a first lateral surface and a second lateral surface opposite to the first lateral surface. The plurality of light guide elements are disposed at the first lateral surfaces. A plurality of cross-section parallel to the first light incident surface in the plurality of light guide elements. The farther the distance from the cross-section to the first light incident surface, the larger the area of the cross-section. After emitting from the light emitting unit, the light is guided by the plurality of light guide elements, and emitted from one of the first and the second lateral surfaces of the light guide plate.

20 Claims, 5 Drawing Sheets

(56) References Cited

U.S. PATENT DOCUMENTS

| | | |
|---|---|---|
| 2012/0224389 A1 | 9/2012 | Kashiwagi et al. |
| 2012/0256974 A1 | 10/2012 | Minami |
| 2012/0257406 A1 | 10/2012 | Minami |
| 2013/0120474 A1* | 5/2013 | Suzuki et al. ............ 345/690 |
| 2013/0162694 A1 | 6/2013 | Suzuki et al. |
| 2014/0301108 A1 | 10/2014 | Mineura et al. |

FOREIGN PATENT DOCUMENTS

| | | |
|---|---|---|
| JP | 201195547 A | 5/2011 |
| TW | 201319622 A1 | 5/2013 |

OTHER PUBLICATIONS

TW Office Action dated Dec. 25, 2015 in corresponding Chinese application (No. 201310203884.6).

* cited by examiner

DISPLAY APPARATUS AND LIGHT EMITTING MODULE THEREOF

This application claims the benefit of Taiwan application Serial No. 102118759, filed May 28, 2013, the subject matter of which is incorporated herein by reference.

BACKGROUND OF THE INVENTION

1. Field of the Invention

The invention relates in general to a display apparatus, a light module and a light guide plate, and more particularly to a display apparatus, a light module and a light guide plate in which areas of cross-sections of light guide elements are variable.

2. Description of the Related Art

In recent years, 2D flat display can no longer satisfy consumers' needs, and related industries are directed towards the development of 3D display technology.

"Parallax barrier" display technology, commonly used in the naked eye 3D display, is based on the principles of light obscuration. A parallax barrier could be a sheet or an electro optic panel with fine slits to separate the light pathway of spatial images into images for left eye and right eye, and this reconstructed scene of the left eye image and right eye image is perceived as 3D images by the observer.

Currently, there is a display could generate parallax barrier directly from the light guide plate of a backlight module. Pluralities of light guide elements are disposed in parallel in the light guide plate. The light is guided off the corresponding light emitting surface of each light guide element in a manner with the bright state and the dark state being staggered with each other, thereby generating a parallax barrier. However, since the paths of the light from the light incident surface to each light guide element are different, the brightness of each bright state will be different. Hence, the overall uniformity of the light and the 3D display effect has deteriorated.

SUMMARY OF THE INVENTION

The invention is directed to a display apparatus, and a light module and a light guide plate thereof. Area of cross-section of each light guide element is adjusted according to the distance from the light guide element to a light incident surface so as to increase brightness uniformity of the light.

According to one embodiment of the present invention, a display apparatus is provided. The display apparatus comprises a display panel and a light module opposite to the display panel. The light module comprises a light guide plate, at least a light emitting unit and a plurality of light guide elements. The light guide plate comprises at least a light incident surface, a first lateral surface and a second lateral surface opposite to the first lateral surface. The light emitting unit corresponds to the light incident surface. The light guide elements are disposed on the first lateral surface with intervals, and have a plurality of cross-sections parallel to the first light incident surface. An area of the cross-section increases with the farther the distance from the cross-section to the first light incident surface increases. After a light emitted from the light emitting unit enters the light guide plate via the light incident surface, the light is guided by the plurality of light guide elements and emitted from one of the first and the second lateral surfaces of the light guide plate with alternated bright state and dark state.

According to another embodiment of the present invention, a light module is provided. The light module comprises a light guide plate, a light emitting unit and a plurality of light guide elements. The light guide plate has a first light incident surface, a first lateral surface and a second lateral surface. The first lateral surface is opposite to the second lateral surface. The light emitting unit corresponds to the first light incident surface. A plurality of light guide elements are disposed on the first lateral surface with intervals, and have a plurality of cross-sections parallel to the first light incident surface. An area of the cross-section increases with the farther the distance from the cross-section to the first light incident surface, the larger increases. After a light emitted from the light emitting unit enters the light guide plate via the first light incident surface, the light is guided by the plurality of light guide elements and emitted from one of the first and the second lateral surfaces of the light guide plate with alternated bright state and dark state.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
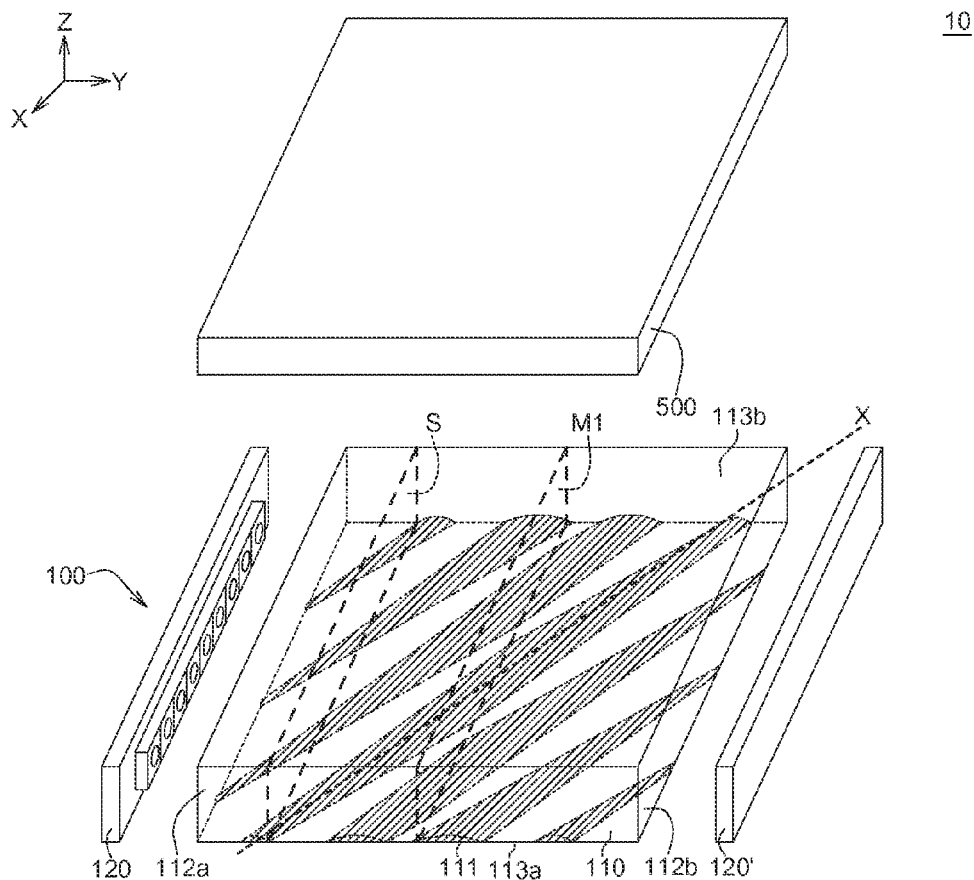
FIG. 1A is a schematic diagram of a display apparatus according to an embodiment of the invention.

Referring to FIG. 1A, a schematic diagram of a display apparatus according to an embodiment of the invention is shown. The display apparatus 10 comprises a light module 100 and a display panel 500 disposed oppositely. The light module 100 comprises a light guide plate 110, a plurality of light guide elements 111 and two light emitting units 120 and 120'.

Figure 1B:
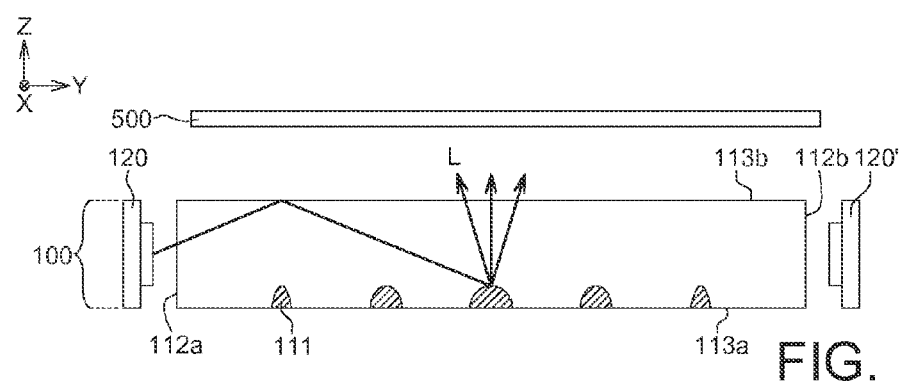
FIG. 1B is a cross-sectional view of the display apparatus of FIG. 1A along a direction perpendicular to the light incident surface (YZ plane)

The light guide plate 110 has a first light incident surface 112a, a second light incident surface 112b, a first lateral surface 113a and a second lateral surface 113h. The light guide plate 110 is type of bilateral edge-lit. The first light incident surface 112a and the second light incident surface 112b are disposed oppositely and substantially parallel to each other. The two light emitting units 120 and 120' correspond to the first light incident surface 112a and the second light incident surface 112b. The light guide plate 110 further has two planes substantially orthogonal with the first light incident surface 112a, the second light incident surface 112b, the first lateral surface 113a and the second lateral surface 113b. A reflective material can be selectively coated or attached on the surface of the light guide plate 110 to recycle the light. The light emitting units 120 and 120' comprise a plurality of light emitting diodes (LEDs) disposed on a driving circuit board in an array. The light emitted from the LEDs corresponds to the first light incident surface 112a or the second light incident surface 112b. The driving circuit is substantially parallel to the first light incident surface 112a or the second light incident surface 112b. The light emitting units 120 and 120' can be cathode ray tube (CRT) or organic light emitting diodes (OLED). The light guide plate 110 guides the light towards the display panel 500. The light guide plate 110 has a size corresponding to that of the display panel, and is formed by a transparent material such as acrylic resin, polycarbonate, polyethylene resins or glass. The invention does not restrict the type of transparent materials, and any transparent materials would do as long as the refractivity of the transparent material is greater than that of material surrounding the light guide plate 110 (such as air whose refractivity is about 1). Referring to FIG. 1B, a cross-sectional view of the display apparatus of FIG. 1A along a direction perpendicular to the light incident surface (YZ plane) is shown. A light L enters in a particular angle at the boundary between the light guide plate 110 and the surrounding material will induce total reflection. Thus, most of the light L entering the light incident surface 112a will not be directly emitted from the light guide plate 110. Instead, the light will be guided to the entire light guide plate 110, making the emitted light uniformly distributed.

In the light guide plate 110, the first lateral surface 113a and the second lateral surface 113b are disposed oppositely. Here, the lateral surface refers to a surface of the light guide plate 110 has a larger area. Referring to FIG. 1B, the second lateral surface 113b and the display panel 500 are disposed oppositely. That is, the second lateral surface 113b is an upper surface (the light emitting surface) of the light guide plate 110, and the first lateral surface 113a is a lower surface (the bottom surface) of the light guide plate 110.

The light emitting units 120 and 120' form a first interface M1 in the light guide plate 110. The interface represents a boundary between a light field of the light emitting unit 120 and a light field of the light emitting unit 120'. Given that the intensities at the light fields of the light emitting units 120 and 120' are equivalent, the first interface M1 is a plane farthest away from the two light emitting units 120 and 120', and positions on the first interface M1 receive lowest intensities of light irradiation. The first interface M1 is an interface with lowest brightness. When the light module 100 has two light emitting units 120 and 120', the first interface M1 is between the first light incident surface 112a and the second light incident surface 112b. When the light module 100 only has one of the light emitting unit 120 and the light emitting unit 120', the other light emitting unit can be regarded as being located at an infinite distance, and the first interface M1 can be regarded as the second light incident surface 112b or the first light incident surface 112a.

Figure 1C:
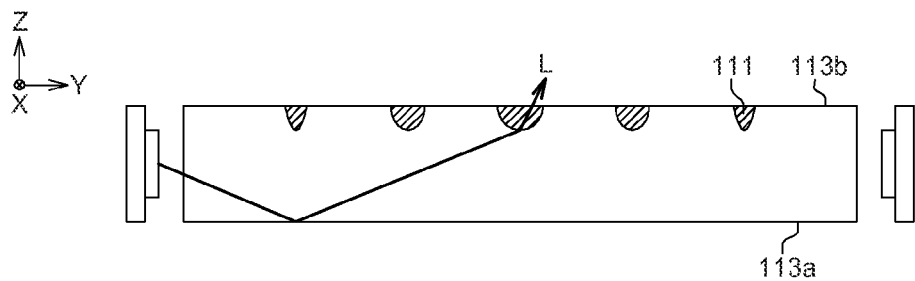
FIG. 1C is a cross-sectional view of a display apparatus along a direction perpendicular to the light incident surface (YZ plane) according to another embodiment.

As indicated in FIG. 1A and FIG. 1B, the light guide elements 111, each being a recess, are disposed on the first lateral surface 113a at intervals. The bottom of each recess faces the second lateral surface 113b and has a depth. Each recess is extended to the second lateral surface 113b from the first lateral surface 113a. The depth of each recess is smaller than the thickness of the light guide plate 110. The extended axial direction of the geometric center of the light guide elements 111 is referred as the central line X, and is also known as the long axis. The inner surface of the recess can be interposed or coated with a reflective material to better scatter the light. Generally speaking, the light L will continuously induce total reflection on the light guide plate 110. When the light L enters the light guide elements 111, the light L is guided by the light guide elements 111 and emitted from the second lateral surface 113b (light emitting surface) with alternated bright lines and dark lines. In other embodiments, the light guide elements 111 can be disposed on the second lateral surface 113b at intervals and extended towards the first lateral surface 113a as indicated in FIG. 1C.

Figure 1D:
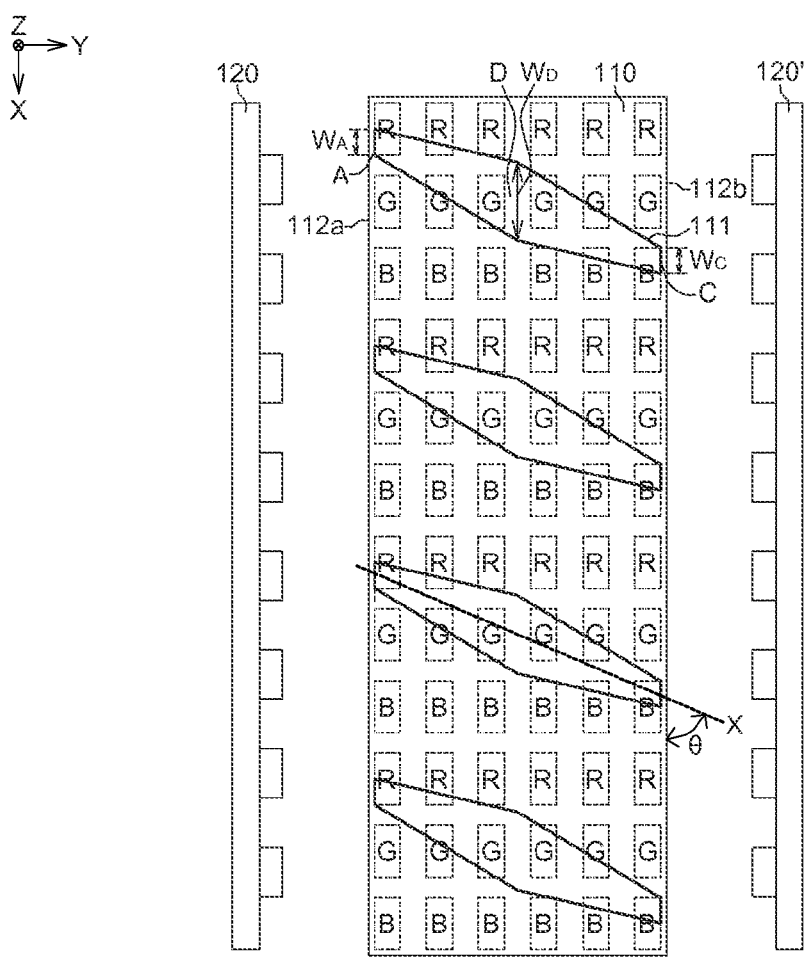
FIG. 1D is a bottom view of the display apparatus of FIG. 1A.

Referring to FIG. 1D, a bottom view of the display apparatus of FIG. 1A is shown. Only a part of light guide elements 111 is illustrated in FIG. 1D. Each of the light guide elements 111 is an elongated recess. In each recess, the width W, the height and the area of cross-section along a direction parallel to the light incident surface (the X-axis direction) are not fixed, and are adjusted according to the distance from each light guide element to the light incident surface. To put it in greater details, one single light guide element 111 has a plurality of cross-sections parallel to the light incident surfaces 112a and 112b (parallel to the normal), and the smaller the distance from a cross-section to the light incident surfaces 112a and 112b, the smaller the area of the cross-section through the reduction in the width or the height (depth). Conversely, the larger the distance from a cross-section to the light incident surfaces 112a and 112b, the larger the area of the cross-section through the increase in the width or the height (depth). In other words, the area of each cross-section of the light guide elements 111 parallel to the light incident surfaces 112a and 112b is positively proportional to the distance from the cross-section to the light incident surfaces 112a and 112b. The proportional relationship can be represented by a straight line or a curve. The above "the distance to the light incident surface" refers to the vertical distance from the cross-section of the light guide elements 111 parallel to the light incident surfaces 112a and 112b to the light incident surface. The width W is the length of an intersecting line formed by the cross-section and the first lateral surface 113a. The height (depth) is the length of a segment of the cross-section perpendicular to the extension line of the width W. Given that the intensities of the light fields of the two light emitting units 120 and 120' are equivalent, the first interface M1 can be regarded as a branch interface. In range between the first interface M1 and the first light incident surface 112a, the change in the width W or the height (depth) corresponds to the first light incident surface 112a. In range between the first interface M1 and the second light incident surface 112b, the change in the width W or the height (depth) corresponds to the second light incident surface 112b. The above relationships are taken as reference in following disclosure. For example, in the light guide elements 111 of FIG. 1C, position A is closer to the first light incident surface 112a, so the width $W_A$ is smaller; position C is closer to the second light incident surface 112b, so the width $W_C$, is also smaller; position D has equal distance to the first light incident surface 112a and the second light incident surface 112b, so the width $W_D$ is a maximum. Here, the change in the width W can be replaced by the change in the height (depth), and both changes are related to the change in the area of the cross-section. Since the probability of the light L being irradiated to the light guide element 111 farther away from the light incident surface will be increased (such as the middle region of the light guide plate in the present example as shown in FIG. 1B), the light guided by the light guide elements 111 to be emitted from the second lateral surface 113b has higher brightness in this particular region, and the overall uniformity of the light will thus be increased.

FIG. 1D further illustrates a relative relationship between a pixel array of the display panel 500 and the light guide elements 111. The display panel 500 comprises a plurality of pixels forming a pixel array in the X-axis direction and the Y-axis direction. Each pixel comprises a plurality of sub-pixels also forming an array. In the present embodiment, each pixel has three sub-pixels R, G, B. In each sub-pixel, the length of the short side is ⅓ of that of the long side. In an embodiment, a maximum width of each light guide element 111 is not greater than 1.5 times of the length of the long side of each sub-pixel, and a minimum width is not less than 0.5 times of the length of the long side. That is, in the same light guide elements 111, the width of the broadest part is equal to or less than 3 times of the width of the narrowest part. Although the light guide elements 111 of FIG. 1D are arranged in a linear and oblique manner, but the invention is not limited thereto. In other embodiments, the included angle θ between the central line X of the light guide elements 111 and the long side of sub-pixels can be any angles greater than 0 degrees and smaller than 90 degrees. Preferably, the included angle θ is greater than 5 degrees and smaller than 50 degrees. The ideal included angle θ is equal to 9.46 degrees (the included angle between the diagonal line of two vertically arranged sub-pixels and the long side), 18.43 degrees (the included angle between the diagonal line of one single sub-pixel and the long side) or 45 degrees (the included angle between the diagonal line of one single pixel and the long side). The light guide elements 111 can be arranged in the form of a curve as long as the light guide elements 111 do not intersect with each other. The above oblique and curved arrangement of light guide elements 111 reduces the occurrence of moire.

TABLE 1

| Panel Size (inch) | Sub-Pixel Size (μm) | Max Width Of Light Guide Elements (μm) | Min Width Of Light Guide Elements (μm) | Light Uniformity Of Light Guide Plate (%) |
|---|---|---|---|---|
| 23.6 | 86 | 85 | 55 | 68.5 |

Table 1 illustrates the range of width change and the measured uniformity of the light for the light guide elements at 23.6-inches display panel. Values illustrated in Table 1 are for elaboration purpose, and the application of the invention is not limited thereto. Through the change in the width of the light guide elements of the light guide plate, the uniformity of the light of the display apparatus of the invention can achieve 68%, which is 34% higher than the uniformity of the light of the generally known display apparatus which is normally below 45%.

Figure 1E:
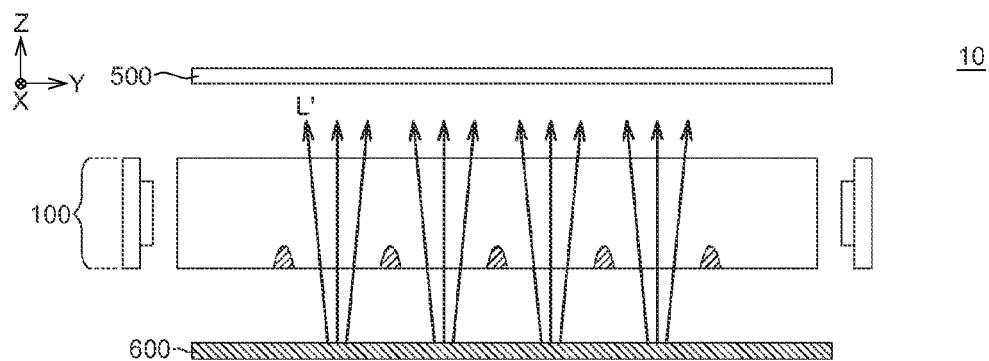
FIG. 1E is a cross-sectional view of a display apparatus according to an embodiment of the invention.

Referring to FIG. 1E. In an embodiment, the display apparatus 10 further comprises a backlight module 600 disposed under the light module 100 for providing a light L' with which the display panel 500 displays 2D images. When the backlight module 600 taken as primary and the light module 100 taken as supplementary are turned on at the same time, the light L' provided by the backlight module 600 and a part of the light L provided by the light module 100 (to supplement the loss of the light due to the obstruction of the light guide elements 111) pass through the entire light guide plate 110 and provide a uniform planar light source with which the display apparatus 10 can display 2D images. When the backlight module 600 is turned off and only the light module 100 emits the light, the light with alternated bright state and dark state can be provided as parallax barrier for displaying 3D images. Thus, the image modes can be switched and the display apparatus 10 can selectively display 2D or 3D images.

Figure 2A:
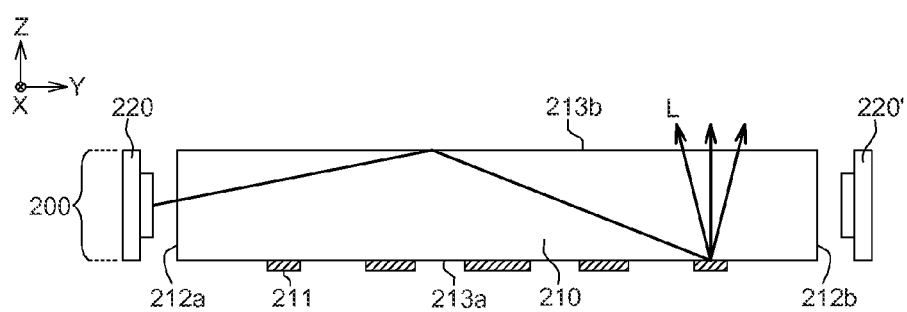
FIG. 2A is a cross-sectional view of a light module along a direction perpendicular to the light incident surface (YZ plane) according to an embodiment of the invention.

Referring to FIG. 2A, a cross-sectional view of a light module 200 along a direction perpendicular to the light incident surface (YZ plane) according to an embodiment of the invention is shown. The light module 200 of the present embodiment is different from the light module 100 of previous embodiment mainly in the shape of the light guide elements, and the similarities are not repeated here.

Figure 2B:
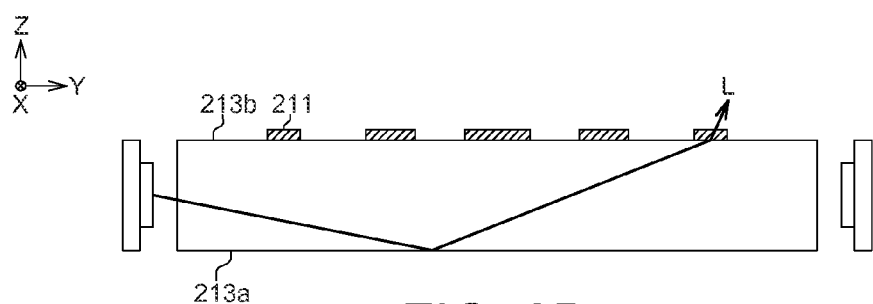
FIG. 2B is a cross-sectional view of a light module along a direction perpendicular to the light incident surface (YZ plane) according to an alternate embodiment of the invention.

As indicated in FIG. 2A, the light guide elements 211, each being a strip-shaped protrusion, are disposed on the first lateral surface 213a of the light guide plate 210. Like FIG. 1C, single light guide element 211 has variable areas of cross-section, widths or heights (depth), the smaller the distance from the single light guide element 211 to the light incident surfaces (212a and 212b), the smaller the width (the area of cross-section or the height), and the larger the distance from the single light guide element 211 to the light incident surface, the larger the width (the area of cross-section or the height). Wherein "the distance to the light incident surface" refers to the distance from a cross-section of light guide elements 211 to the nearest light incident surface, and the width refers to the width of the light guide elements 211 parallel to the light incident surface direction (XZ plane direction). In the present embodiment, the light guide elements 211 are not arranged along the Y-axis direction, so a plurality of light guide elements 211 can be seen in FIG. 2A showing a cross-sectional view along the YZ direction. Since each light guide element 211 may have different areas of cross-section, widths or heights (depth), the probability of the light being emitted to the plurality of light guide elements 211 (such as the middle region of the light guide plate 210) farther away from the light incident surface can be increased. Accordingly, uniformity of the light guided by the plurality of light guide elements 211 to be emitted from the second lateral surface 213b is also increased. As indicated in FIG. 2B, the light guide elements 211 can also be disposed on the second lateral surface 213b, wherein the top of the protrusion is farther away from the second lateral surface 113b. A reflective material can be coated on an outer surface of the plurality of light guide elements 211. The material coated on the recess or protrusion of the plurality of light guide elements enables the light to be better scattered, reflected or refracted, such that the brightness of the light being scattered, reflected or refracted in the recesses or protrusions can be differentiated from the bright of the light reflected in other area, and the light emitted from the light guide plate will have alternated dark state and bright state to form a parallax barrier necessary for displaying 3D images.

Figure 3:
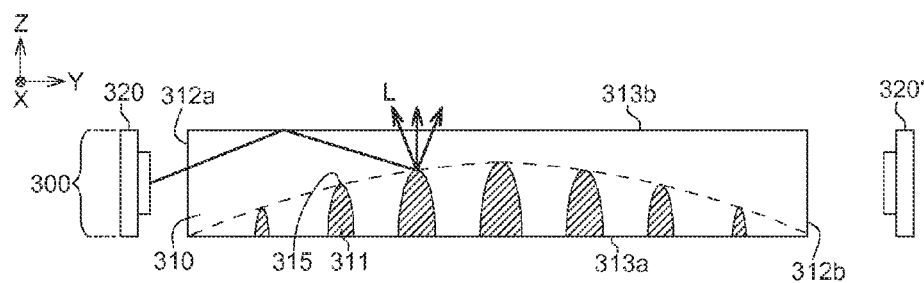
FIG. 3 is a cross-sectional view of a light module along a direction perpendicular to the light incident surface (YZ plane) according to an embodiment of the invention.

Referring to FIG. 3, a cross-sectional view of a light module 300 along a direction perpendicular to the light incident surface (YZ plane) according to an embodiment of the invention is shown. The light module 300 of the present embodiment is different from the light module 100 of the previous embodiment mainly in the depth of the light guide elements, and the similarities are not repeated here.

The light guide elements 311 of FIG. 3 are recesses each having a bottom 315. The bottom 315 is the part of the cross-section of light guide elements 311 nearest to the second lateral surface (light emitting surface). In the present embodiment, both the width and the depth of the single light guide element 311 are not fixed. To put it in greater details, the smaller the distance from the light guide element 311 to the light incident surface, the smaller the depth, and the larger the distance from the light guide element 311 to the light incident surface, the larger the depth. Here, "the distance to the light incident surface" refers to the distance from the cross-section of the light guide element 311 to the nearest light incident surface (312a, 312b). In other words, when the thickness of the light guide plate 310 is uniform, the bottom 315 of the light guide element 311 is farther away from the nearest light incident surface, the smaller the remaining thickness of the light guide plate 310. Thus, the optical path of the light from the light incident surface to the light guide elements 311 farther away from the light incident surface is reduced, but the optical path of the light from the light incident surface to the nearest light guide element 311 remains unchanged. Such compensation makes the light more likely to be guided by the light guide elements 311 farther away from the light incident surface. Through the change in the width of the light guide elements 311, uniformity of the light guided by the light guide elements 311 to be emitted from the second lateral surface 313b can thus be increased.

Figure 4A:
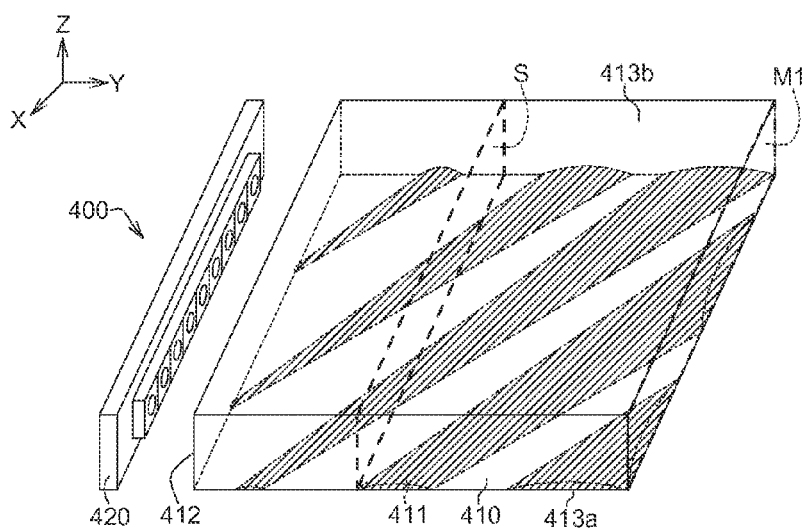
FIG. 4A is a schematic diagram of a light module according to an embodiment of the invention.

FIG. 4A is a schematic diagram of a light module 400 according to an embodiment of the invention. The light module 400 is different from the light module of previous embodiment mainly in that the light guide plate 410 is unilateral edge-lit type. The light module 400 comprises a light guide plate 410 and a light emitting element 412. The light guide plate 410, being unilateral edge-lit, only has a light incident surface 412. The light emitting unit 420 corresponds to light incident surface 412. The first interface M1 is a light incident surface opposite to the light incident surface 412.

Figure 4B:
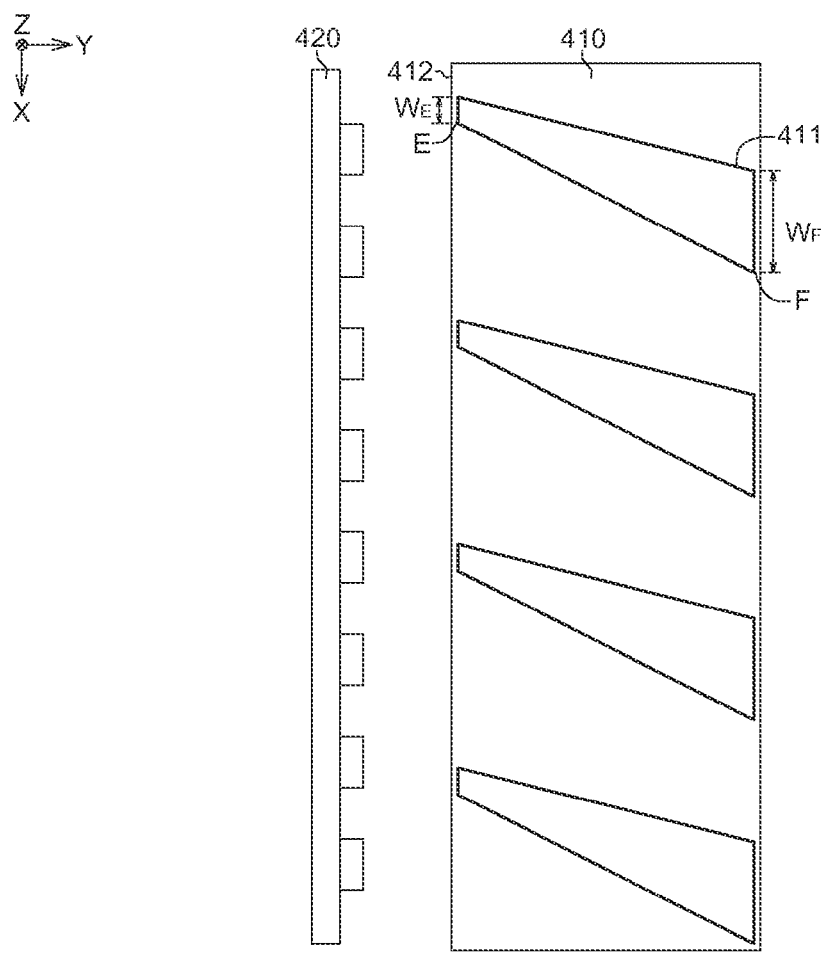
FIG. 4B is a bottom view of the light module of FIG. 4A.

Referring to FIG. 4B, a bottom view of the light module of FIG. 4A is shown. FIG. 4B only illustrates a part of the light guide elements 411. Pluralities of light guide elements 411 are disposed on the first lateral surface 413a of the light guide plate 410. The width W of the plurality of light guide elements 411 parallel to light incident surface direction (X-axis direction) can be adjusted according to the distance from the light guide elements 411 to the light incident surface. In one single light guide element 411, the smaller the distance from the light guide element 411 to the light incident surface, the smaller the width (the area of cross-section, the height, or the depth), and the larger the distance, the larger the width (the area of cross-section, the height, or the depth). For example, the width $W_F$ at the position F is greater than the width $W_E$ at the position E.

Figure 4C:
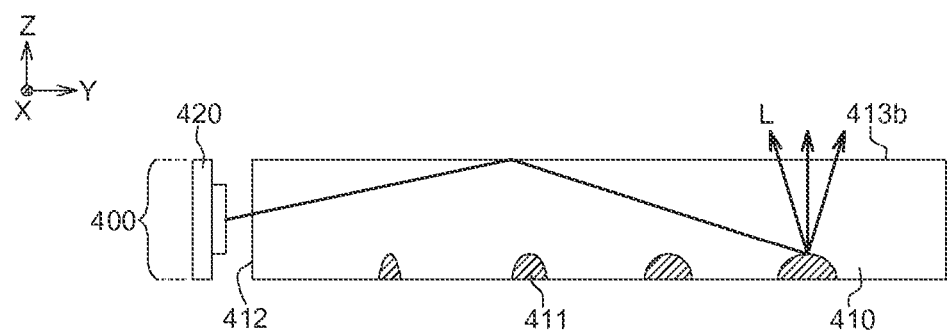
FIG. 4C is a cross-sectional view of the light module of FIG. 4A along a direction perpendicular to the light incident surface (YZ plane).

Referring to FIG. 4C, a cross-sectional view of the light module 400 of FIG. 4A along a direction perpendicular to the light incident surface (YZ plane) is shown. Since the area of cross-section, the width or the height (depth) of the light guide elements 411 is adjusted according to the distance from the cross-section of the light guide elements 411 to the light incident surface 412, Since the probability of the light L being irradiated to the light guide element 411 farther away from the light incident surface 412 will be increased (such as the right-hand side region of the light guide plate in the present example), the light of this particular region guided by the light guide elements 411 to be emitted from the second lateral surface 413b will have higher brightness, and the overall uniformity of the light will thus be increased.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display apparatus, comprising:
a display panel; and
a light module opposite to the display panel, wherein the light module comprises:
a light guide plate having a first light incident surface, a first lateral surface and a second lateral surface opposite to the first lateral surface;
a first light emitting unit corresponding to the first light incident surface; and
a plurality of light guide elements disposed on the first lateral surface with intervals, wherein the light guide element has a plurality of cross-sections parallel to the first light incident surface, and an area of the cross-section increases as the distance from the cross-section to the first light incident surface increases to a certain distance from the light incident surface, and thereafter the area of the cross-section decreases as the distance from the cross-section to the first light incident surface continues to increase;
wherein, after a light is emitted from the first light emitting unit and enters the light guide plate via the first light incident surface, the light is guided by the plurality of light guide elements and emitted from one of the first and the second lateral surfaces of the light guide plate with alternated bright state and dark state.

2. The display apparatus according to claim 1, wherein each cross-section of light guide elements has a width on the first lateral surface, and the farther the distance from the cross-section of each light guide element to the first light incident surface, the larger the width of the cross-section on the first lateral surface.

3. The display apparatus according to claim 2, wherein a length of long side of each sub-pixel of the display panel is X, the width of the cross-section of each light guide element on the first lateral surface is between 0.5X and 1.5X.

4. The display apparatus according to claim 1, wherein each light guide element is a recess or a protrusion.

5. The display apparatus according to claim 4, wherein each light guide element is a recess and has a bottom being a part of the recess nearest to the second lateral surface, and the farther a distance from the bottom to the first light incident surface, the smaller a distance from the bottom to the second lateral surface.

6. The display apparatus according to claim 4, wherein each light guide element is a protrusion and has a top being a part of the protrusion farthest away from the second lateral surface, and the farther a distance from the protrusion to the first light incident surface, the farther a distance from the top to the second lateral surface.

7. The display apparatus according to claim 1, wherein each light guide element surface includes a reflective material.

8. The display apparatus according to claim 1, wherein central line direction of each light guide element and the long side of sub-pixel of the display panel form an angle, and the angle is greater than 5 degrees and smaller than 50 degrees.

9. The display apparatus according to claim 1, wherein the light module is a parallax barrier element of the display apparatus.

10. The display apparatus according to claim 9, further comprising a backlight module, the light module being interposed between the display panel and the backlight module, wherein the backlight module is turned off when the display apparatus displays 3D images, and is turned on when the display apparatus displays 2D images.

11. The display apparatus according to claim 1, wherein the light guide plate of the light module has a second light incident surface opposite to the first light incident surface, and the light module comprises:

a second light emitting unit corresponding to the second light incident surface;

wherein the light guide plate has a first interface between the first light incident surface and the second light incident surface, in range between the first light incident surface and the first interface, the farther the distance from the cross-section of each light guide element to the first light incident surface, the larger the area of the cross-section, and in range between the first interface and the second light incident surface, the farther the distance from the cross-section of each light guide element to the second light incident surface, the larger the area of the cross-section.

12. A light module, comprising:

a light guide plate having a first light incident surface, a first lateral surface and a second lateral surface, wherein the first lateral surface is opposite to the second lateral surface;

a first light emitting unit corresponding to the first light incident surface; and a plurality of light guide elements disposed on the first lateral surface with intervals, wherein the light guide element has a plurality of cross-sections parallel to the first light incident surface, and an area of the cross-section increases as the distance from the cross-section to the first light incident surface increases to a certain distance from the light incident surface, and thereafter the area of the cross-section decreases as the distance from the cross-section to the first light incident surface continues to increase;

wherein, after a light emitted from the first light emitting unit enters the light guide plate via the first light incident surface, the light is guided by the plurality of light guide elements and emitted from one of the first and the second lateral surfaces of the light guide plate with alternated bright state and dark state.

13. The light module according to claim 12, wherein each cross-section of light guide elements has a width on the first lateral surface, and the farther the distance from the cross-section of each light guide element to the first light incident surface, the larger the width of the cross-section on the first lateral surface.

14. The light module according to claim 13, wherein the light module provides light source to a display panel, a length of long side of each sub-pixel of the display panel is X, the width of the cross-section of each light guide element on the first lateral surface is between 0.5X and 1.5X.

15. The light module according to claim 12, wherein each light guide element is a recess or a protrusion.

16. The light module according to claim 15, wherein each light guide element is a recess and has a bottom being a part of the recess nearest to the second lateral surface, and the farther a distance from the bottom to the first light incident surface, the smaller a distance from the bottom to the second lateral surface.

17. The light module according to claim 15, wherein each light guide element is a protrusion and has a top being a part of the protrusion farthest away from the second lateral surface, and the farther a distance from the protrusion to the first light incident surface, the farther a distance between the top and the second lateral surface.

18. The light module according to claim 12, wherein each light guide element surface has a reflective material.

19. The light module according to claim 12, wherein central line direction of each light guide element and the long side of sub-pixel of a display panel form an angle, and the angle is greater than 5 degrees and smaller than 50 degrees.

20. The light module according to claim 12, wherein the light guide plate has a second light incident surface opposite to the first light incident surface, the light module further comprises a second light emitting unit corresponding to the second light incident surface, the light guide plate has a first interface between the first light incident surface and the second light incident surface, in range between the first light incident surface and the first interface, the farther the distance from the cross-section of each light guide element to the first light incident surface, the larger the area of the cross-section, and in range between the first interface and the second light incident surface, the farther the distance from the cross-section of each light guide element to the second light incident surface, the larger the area of the cross-section.

* * * * *